United States Patent [19]
Wendhack

[11] Patent Number: 5,462,294
[45] Date of Patent: Oct. 31, 1995

[54] COLLET ADAPTER FOR CONVERTING MACHINE VISE TO AN ORTHOGONAL COLLET FIXTURE

[76] Inventor: Kurt F. Wendhack, 700 Perrie Dr. Unit 308, Elk Grove Village, Ill. 60007

[21] Appl. No.: 312,272

[22] Filed: Sep. 26, 1994

Related U.S. Application Data

[63] Continuation-in-part of Ser. No. 265,270, Jul. 1, 1994.

[51] Int. Cl.$^6$ .............. B23B 31/20; B23Q 3/06; B25B 1/02
[52] U.S. Cl. .............. 279/51; 269/88; 279/50; 279/143
[58] Field of Search .............. 279/50, 51, 143, 279/145; 269/88; 409/225

[56] References Cited

U.S. PATENT DOCUMENTS 2,621,938  12/1952  Zieglar ............ 279/50
4,943,071  7/1990  Srebot et al. ............ 279/50

*Primary Examiner*—Steven C. Bishop

[57] ABSTRACT

An adapter for converting a standard machine vise into a set-up orthogonal collet fixture including front and back members that bolt to the vise jaws after the vise jaw plates have been removed, an internally tapered sleeve in the back member for engaging a taper on a standard 5C Collet, a take-up nut seated in the same member for engaging threads on the end of the collet to hold the collet, and a cam for moving the sleeve relative to the collet as the vise is closed causing the front member to move toward the back member pulling or pushing the sleeve over the collet thereby causing the collet to clamp the workpiece.

17 Claims, 7 Drawing Sheets

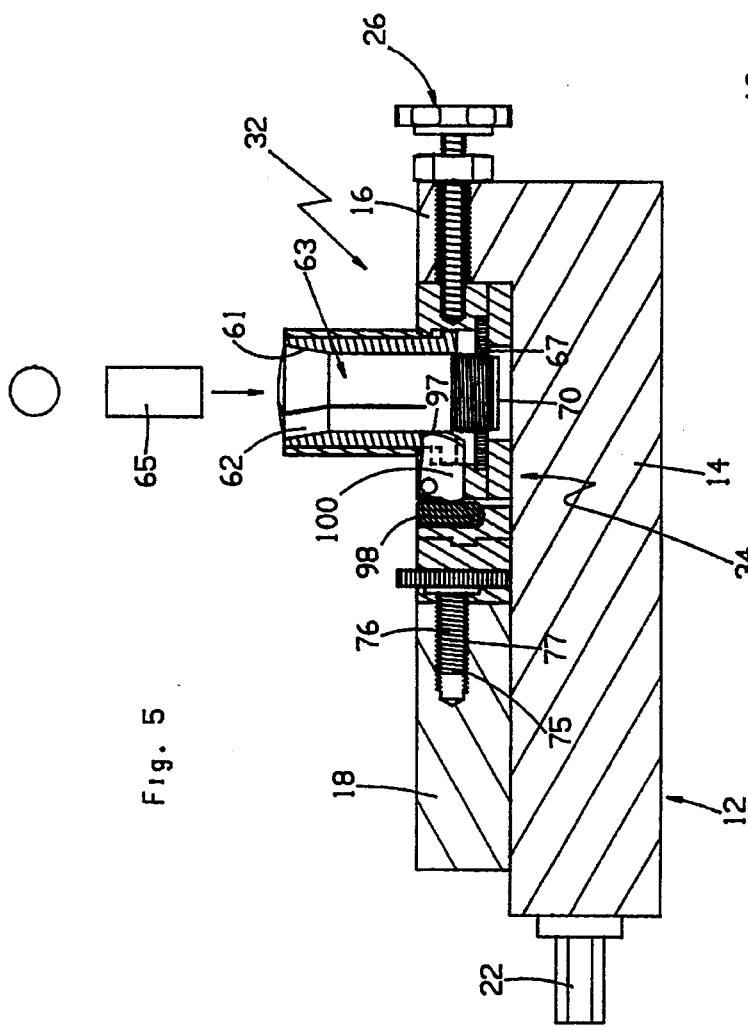
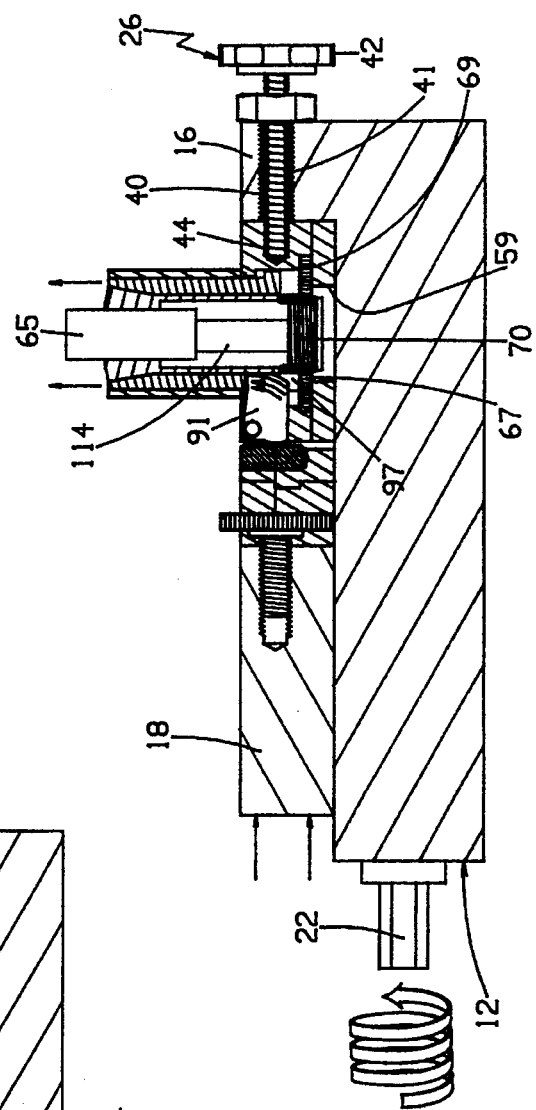

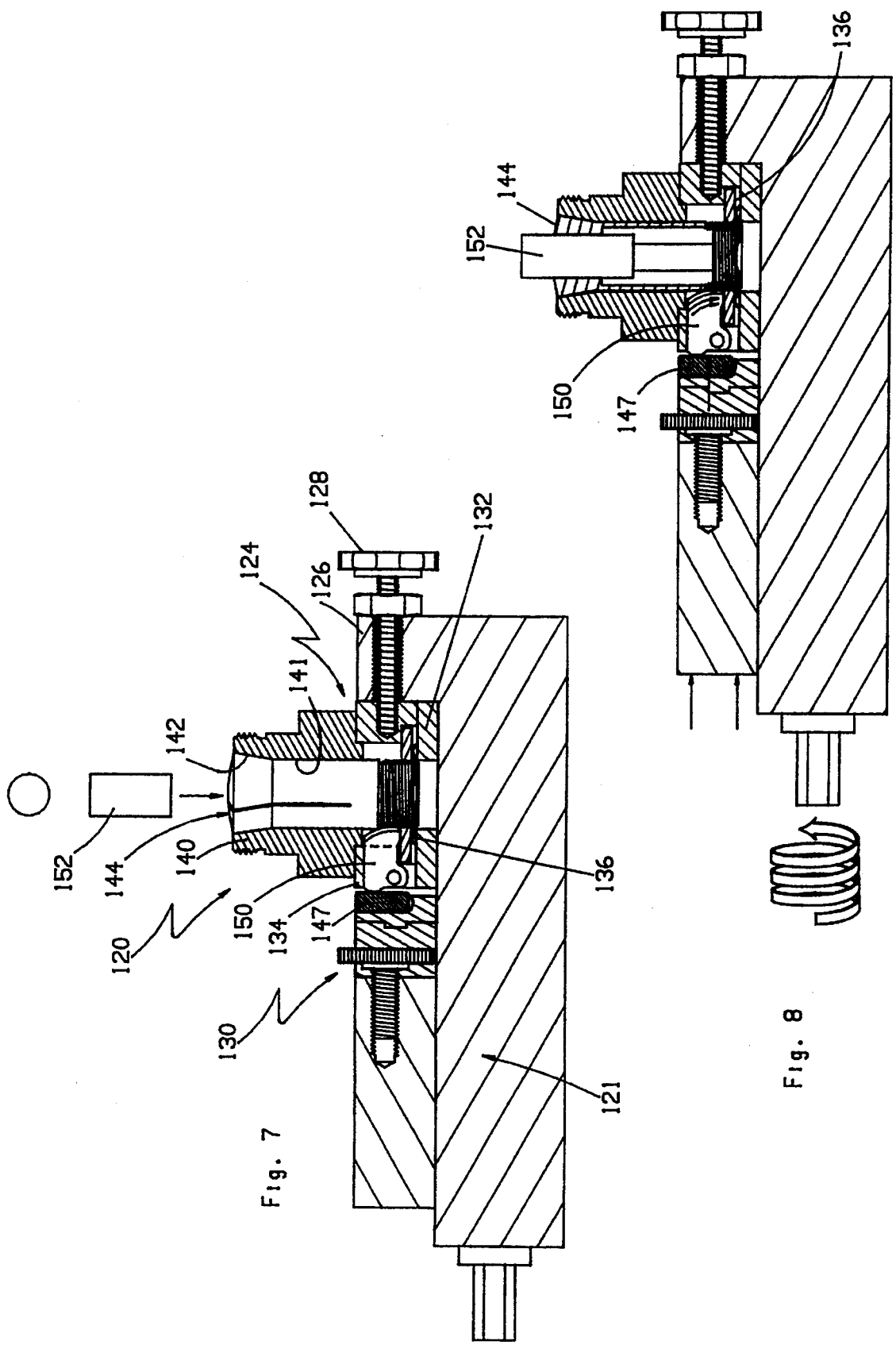

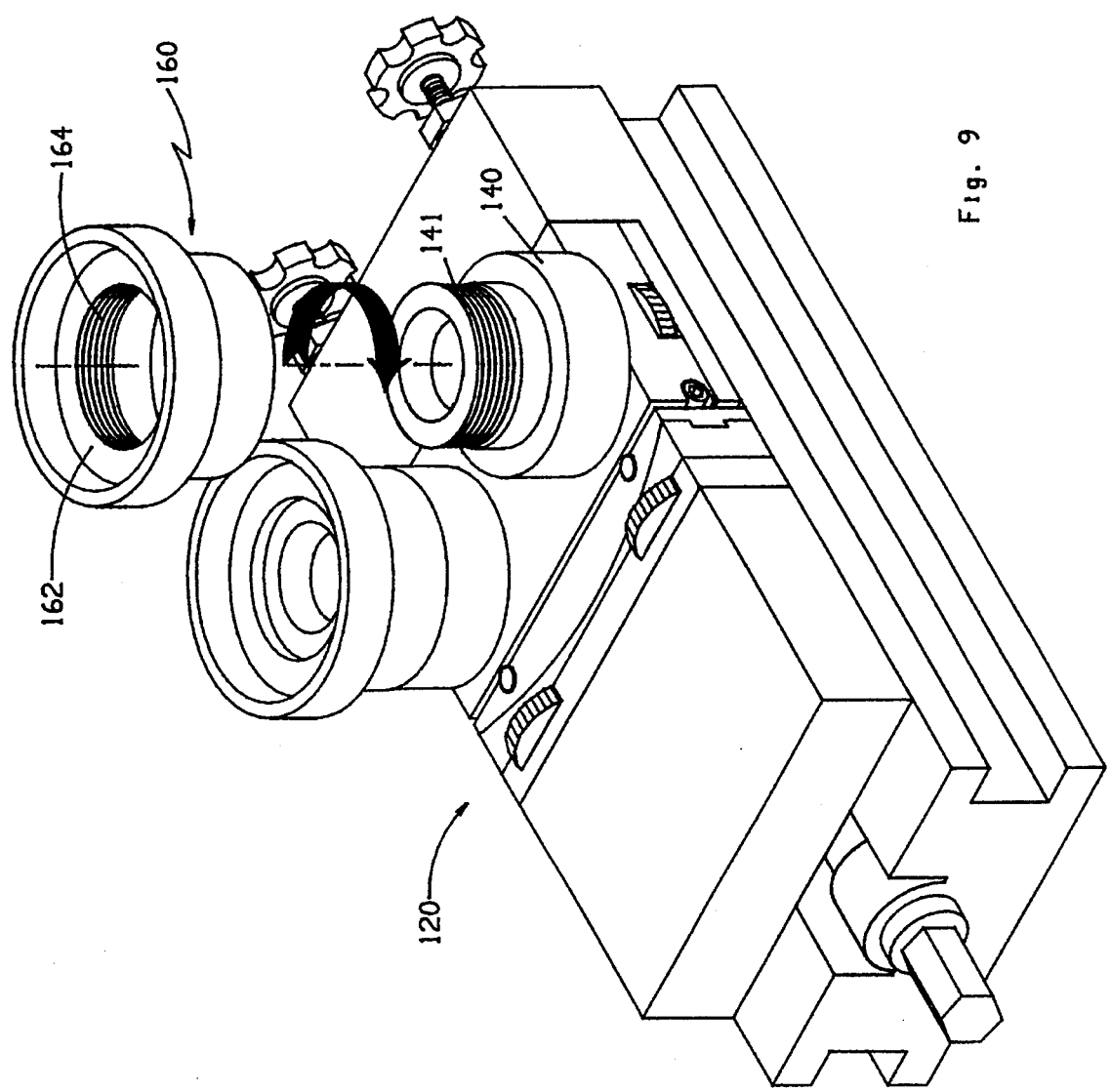

COLLET ADAPTER FOR CONVERTING MACHINE VISE TO AN ORTHOGONAL COLLET FIXTURE

RELATED APPLICATIONS

This application is a continuation-in-part of my U.S. patent application, Ser. No. 265,270, Filed: Jul. 1, 1994, entitled COLLET ADAPTER FOR CONVERTING MACHINE VISE TO A COLLET FIXTURE.

BACKGROUND OF THE PRESENT INVENTION

Metal working shops and plants commonly use devices referred to as "collet fixtures" for holding bar stock on machine beds or tables as the workpieces are machined by such operations as milling, drilling, tapping and grinding. Most of these collet fixtures have a workpiece clamping and engaging element called a "5C Collet" which is a collet similar to those found in milling machine spindles for holding and clamping milling tools except the 5C Collets are externally threaded rather than internally threaded as in the milling tool collets.

The 5C Collet is conventionally machined from round bar stock and includes a central through bore, a single diameter shank portion with a threaded end, and a frusto-conical portion at the opposite end having a plurality of slots milled radially therethrough that extend through to the central bore. As the resulting frustoconical segments are cammed by some external taper, they flex inwardly grasping the cylindrical bar stock workpiece thereby holding it firmly in position.

There are generally two types of collet fixtures presently popular in the machine tool industry, one that includes an axially fixed 5C Collet that utilizes a movable member for camming the collet closed, and one that utilizes a movable collet that engages a stationary camming surface for causing the collet to close. In both cases, however, these collet fixtures include a supporting frame that must be aligned, referenced, and clamped and bolted to the machine bed, whether it be a drilling machine, a tapping machine, a milling machine, or a grinding machine.

One such collet fixture is the Yuasa collet fixture having a Rutland Tool and Supply Co., Inc.(City of Industry, Calif.), Part No. 2411-5360(1994). This collet fixture includes a cast iron rectangular base that is bolted to the machine bed carrying a plurality of sleeves and nuts that surround a collet for holding the workpiece in position. A lever action indexing handle permits these sleeves and rings to be rotated so that the workpiece can be machined at various angles. The collet slides inside this type of fixture. It is held in place by an adjusting nut. Rotation of the sleeve assembly is controlled by the use of a key in the fixture and a key way in the collet. As the fixture mechanism is actuated, the collet is drawn into an internal taper. As pressure increases, the taper in the fixture forces the taper on the collet to collapse, closing the inside of the collet. In this style of fixture, the collet moves until the workpieces clamps. The smaller the workpiece, the farther the collet must travel to achieve its goal. Until clamping occurs, both the collet and the work move together. If the work varies in size, the position of the work in its set-up varies proportionately. Controlling the work size may be required for an efficient set-up.

The second type of collet fixture commonly found in the industry utilizes a fixed collet actuated by a movable sleeve. One such collet fixture is referred to as a horizontal and vertical 5C Collet fixture, Part No. 2404-0005 also sold by Rutland Tool and Supply. This fixture utilizes a sleeve with an inside taper matching that on the collet. The collet is held in place in the fixture by an adjusting nut. As the fixture mechanism is actuated, the sleeve moves rather than the collet. The taper in the sleeve is forced into the taper on the collet. The collet responds by collapsing until it firmly embraces the workpiece. The smaller the workpiece, the farther the sleeve must travel to fully engage the collet. Since the collet does not move, the size of the work does not effect the position of the work. The disadvantage to this style is that it does not allow the use of step chucks.

The disadvantage in both of these types of collet fixtures is that they require very accurate set-up and clamping to the machine bed or table before they can be utilized.

There have also been provided in the past collet block chucks that are essentially tapered sleeves that can be clamped in a vise that are designed to receive 5C Collets. These essentially are simply square blocks with a collet receiving opening therethrough or hexagonal blocks, both of which are clamped directly in the machine vise. These block chucks require alignment in the vise with respect to the machining axis or axes in the same way that the collet fixtures do, and they also lack the structural integrity required for many machining operations. Also clamping and unclamping occurs either by tightening a nut on the collet with a spanner wrench or via a small cam actuating lever. The latter lacks strength and rigidity and the spanner wrench consumes valuable production time.

In my co-pending parent application, Ser. No. 265,270, Filed: Jul. 1, 1994, of which this application is a continuation-in-part, an adapter is provided for converting a standard machine vise into a set-up collet fixture that in most cases eliminates the requirement for set-up in the 5C Collet fixtures presently known in the metal working industry. As described above, the collet fixtures presently known in the industry require clamping and mounting to the machine bed or table in preparation for workpiece machining. This set-up includes the accurate vertical and horizontal alignment of the axis of the fixture with the axes of the table upon which it is mounted. This is not only a critical set-up but also one that is time-consuming for the machine operator.

It is quite common in metal workpiece machining departments for machine vises to remain mounted on the machine table in a set-up position; i.e., aligned with the machine axes, for long periods of time to eliminate the need for removal and remounting. Thus, the mounted machine vise becomes an extremely convenient location for a collet fixture because if so utilized it would eliminate the need for collet fixture alignment to the machine axes. This is what the invention disclosed in my parent application accomplishes, and it does so with an adapter that after removal of the vise jaw plates from the machine vise, bolts to the vise jaw plate receiving holes in the vise jaws which locates the adapter in x, y and z orthogonal coordinates with respect to the machine tool frame.

This converting adapter includes front and back members that bolt to the vise members, an internally tapered sleeve in the members for engaging the taper on a standard 5C Collet in the sleeve, and a nut seated in the back member for engaging threads at the end of the collet for holding the collet stationary to the vise as the vise is opened. Vise opening causes the front member to move axially away from the back member, pulling the sleeve over the stationary collet and causing the collet to clamp the workpiece.

It is a primary object of the present invention to provide an adapter similar to the one disclosed in my parent application except specifically directed to orthogonal or vertically oriented single and dual collet fixtures.

SUMMARY OF THE PRESENT INVENTION

In accordance with the present invention, an adapter is provided for converting a standard machine vise into a vertical or orthogonal set-up fixture that in most cases eliminates the requirements for set-up in the 5C Collet fixtures presently known in the metal working industry. This converting adapter includes front and back members that bolt to the vise elements with manually operable hand wheels that enable the adapter to be connected to the machine vise much more rapidly than in the conventional bolt embodiment disclosed and described in my parent application.

There are two embodiments disclosed in this application, and in both one or more pivotal cams is provided for translating movement of the vise jaws in a closing direction into movement of the adapter sleeve relative to the adapter collet in an orthogonal direction. In one embodiment the sleeve is stationary and the collet moves axially, and in the other, the collet is stationary and the sleeve moves axially.

This improved adapter is also capable of having tandem or paired sleeves and collets to accommodate two workpieces which may in fact have somewhat different diameters, each requiring a separate cam for its relative sleeve to collet movement. To provide equal forces to these cams as the vise jaws close, bearing in mind that the adapter in my parent application effected clamping by vise jaw opening as opposed to closing, a rocker and rocker nest are provided having sliding pivotal movement about a vertical axis to distribute forces equally between the two cams.

Other objects and advantages of the present invention will appear more clearly from the following detailed description of the invention.

BRIEF DESCRIPTION OF THE DRAWINGS

FIG. 5 is a longitudinal section of the adapter according to the present invention assembled into a machine vise prior to insertion of the workpieces therein;

FIG. 6 is a longitudinal section of the present adapter assembled into a machine vise similar to FIG. 5 with the workpiece inserted into the collet after vise opening and workpiece clamping.

FIG. 7 is a longitudinal section of a second embodiment of the present adapter assembled into a machine vise prior to workpiece insertion;

FIG. 8 is a longitudinal section of the adapter illustrated in FIG. 7 assembled into a machine vise with a workpiece inserted therein after machine vise opening and workpiece clamping;

FIG. 9 is a perspective view of the adapter illustrated in FIGS. 7 and 8 with one chuck closer installed and the other in preparation for installation, and;

DETAILED DESCRIPTION OF THE PREFERRED EMBODIMENT

Figure 1:
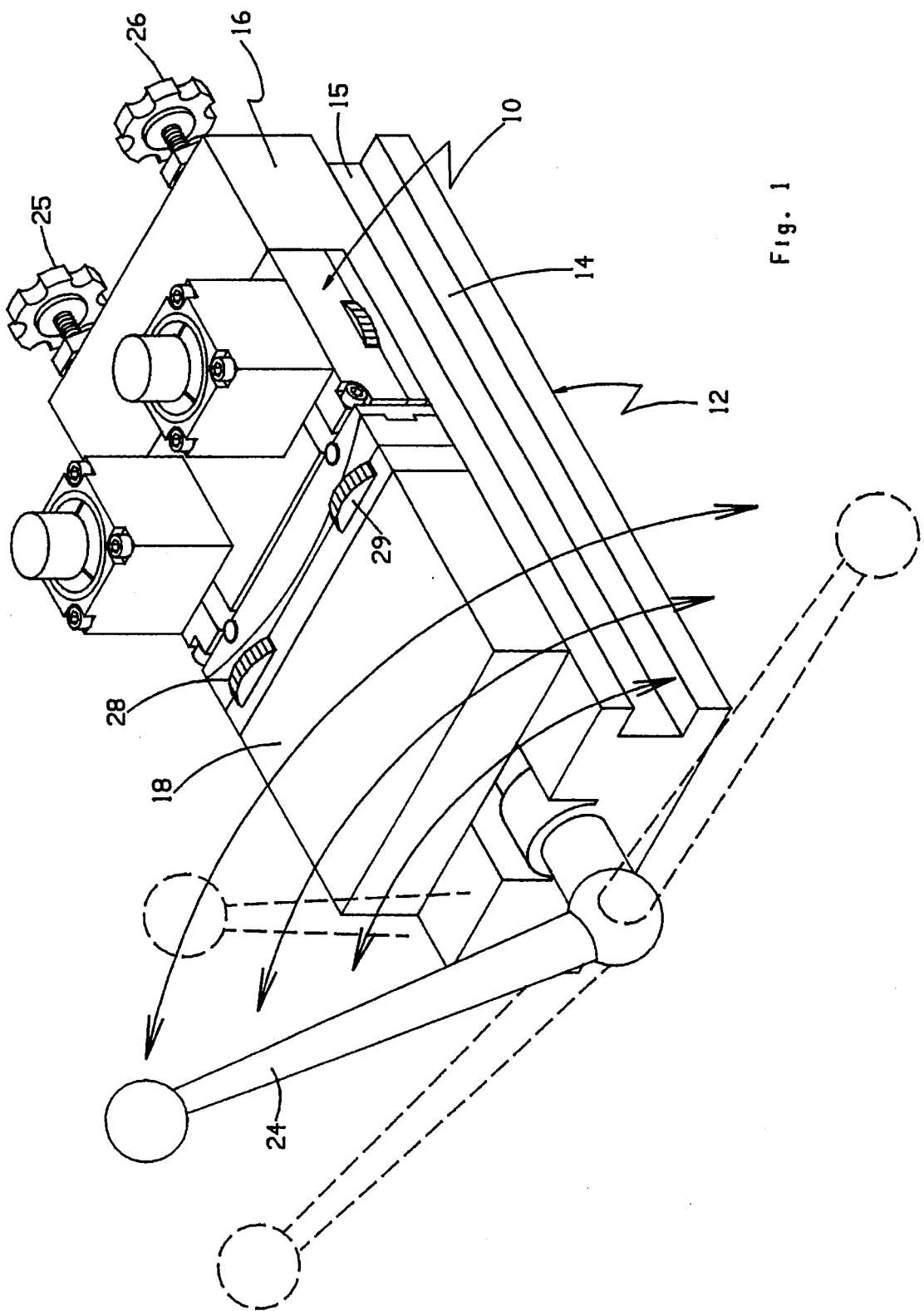
FIG. 1 is a perspective view of an adapter according to the present invention assembled into a conventional machine vise.

Viewing FIG. 1, a collet adapter 10 is illustrated in accordance with the present invention mounted in a standard machine vise 12. The machine vise 12 includes a stationary base 14 having side channels 15 that are utilized with clamping systems to clamp the vise to a machine bed or table. A stationary jaw element 16 is integral with the base 14 and a movable jaw element 18 is reciprocated by a screw 20 carried by the base 14, having a hexagonal stub shaft 22 (FIGS. 5 and 6) rotated by an actuating arm 24(FIG. 1).

The adapter 10 is mounted to the vise elements 16 and 18 with a pair of quick connect hand bolts 25 and 26 which pass through stationary vise element 16 and a pair of front clamp bolts 28 and 29 which thread into the movable vise element 18.

Figure 2:
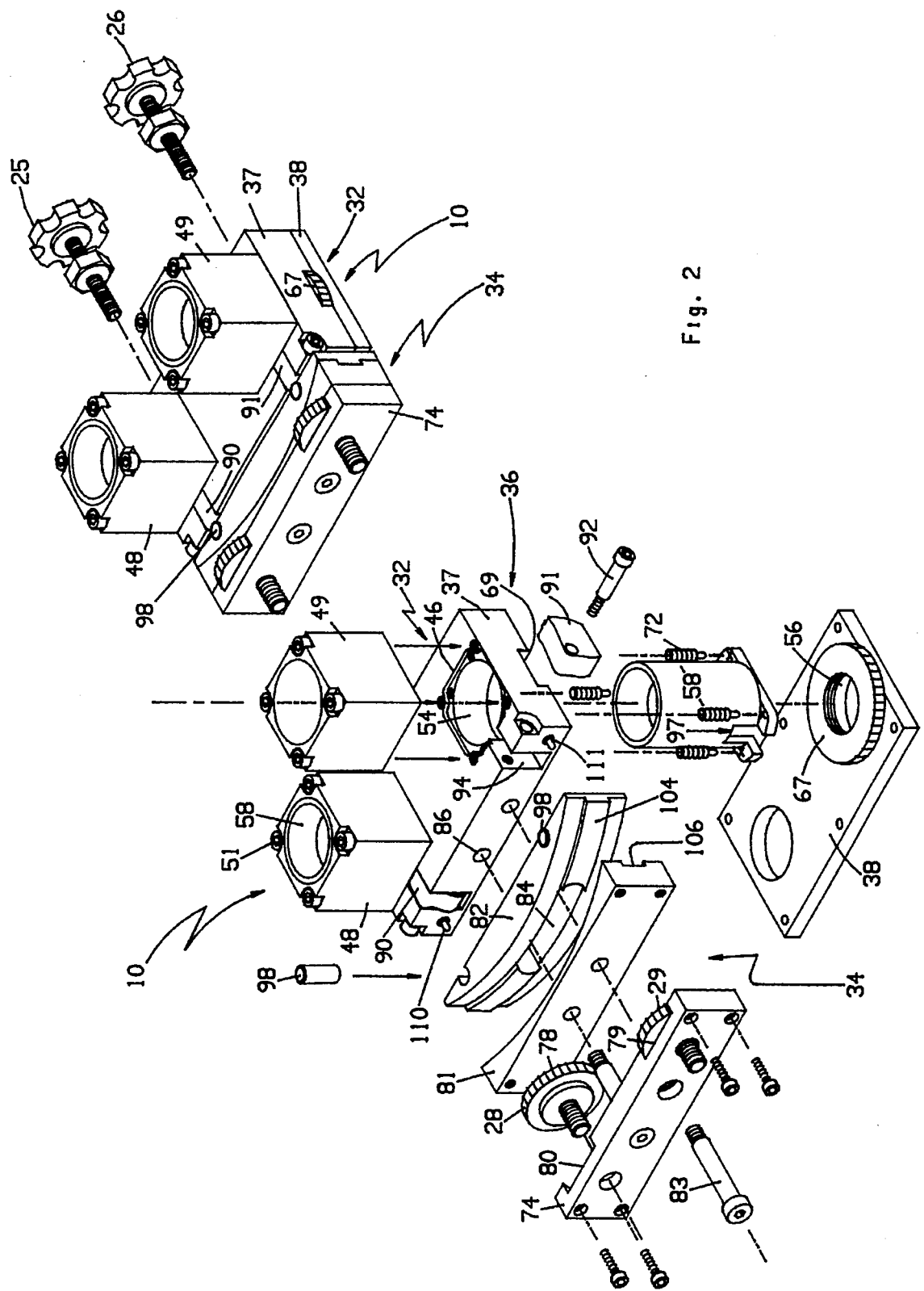
FIG. 2A is a perspective view of the present adapter assembled and separated from the machine vise.
FIG. 2B is an exploded perspective of the adapter illustrated in FIG. 2A.

The assembly perspective of FIG. 2A and the exploded perspective of FIG. 2B, both of which are limited to the collet and adapter 10, provide an excellent insight into the internal construction of the adapter, which includes a fixture body or member 32 and an actuator member 34.

The fixture body 32 includes a generally rectangular base 36 including an upper plate 37 and a complementary engaging lower plate 38.

After the actuator member 34 is connected to vise element 18 by the clamp bolts 28 and 29, the base 36 is fixed to the stationary jaw element by the quick connect hand bolts 25 and 26, as seen in FIG. 6 for example, each including a threaded portion 40 which freely passes through threaded bores 41 in the stationary vise element 16, and of course, bores 41 would normally receive the jaw plate bolts that hold the jaw plates to the inside of the stationary jaw element. The hand bolts 25 and 26 also include a hand wheel 42 and a back up nut 43 threaded to threaded portion 40. Fixture 32 is attached to the stationary vise element 16 by threading the hand wheels 25 and 26 into fixture body plate bores 44 until they bottom out, after which nuts 43 are backed down against the outside surface of the vise drawing the plates 37 and 38 against the stationary vise element 16 in a very rapid and easy fashion.

The upper base plate 37 and their pair of rectangular shallow recesses 46 therein receive a pair of cylinder blocks 48 and 49 that are each fixed thereto by four long cap screws 51. Each of the cylinder blocks 48 and 49 has a bore 53 therethrough co-axial with a slightly larger through bore 54 in base plate 37 and a smaller through bore 56 in lower base plate 38.

The bores 53 and 54 receive an axially slidable sleeve 58 having an upper outer diameter, as seen in FIGS. 5 and 6, slidable in cylinder block bores 53 and an enlarged lower flange portion 59 slidable in upper base plate bores 54.

As seen in FIG. 5, the sleeves 58 have an upper frustoconical portion 61 that engages a complementary upper frusto-conical portion 62 on 5C Collet 63 to effect collet clamping. Collet 63 is seen to have three splits at 64 so that it can clamp workpiece 65 indicated in FIGS. 5 and 6.

The collet 63 is initially drawn into the sleeve 58 by take-up nuts 67 that are rotatable on the upper surface of lower base plate 38 and in a pair of circular recesses 69 in the lower surface of the upper base plate 37 co-axial with the bores 54. The take-up nuts 67 thread onto the lower threaded portion 70 of the collets and project radially somewhat out from the fixture body 32 as seen in FIG. 2A to permit the take-up nuts to be thumb rotated by the machine operator.

As seen in FIG. 2B, the sleeves 58 are each biased to their lowermost position shown in FIG. 5 by four spring plungers 72.

The actuator member 34 bolts to the movable vise element 18 and activates cams that effect relative movement of the sleeves 58 relative to the collet 63 to effect workpiece clamping. Toward this end, the actuator member 34 includes a rocker base 74 that is clamped to the movable vise element 18 by the front clamp bolts 28 and 29 that have threaded portions 75 that thread into a pair of bores 76 in the movable clamp member 18 that normally receive the jaw plate associated with that part of the machine vise, which of course has been removed in all of the drawings. The clamp bolts 28 and 29 include thumb wheels 78 and 79 that rotate in a pair of circular recesses 80 in the rear of the rocker base 74.

As seen more clearly in FIG. 2B, the actuator member 34 includes not only the rocker base 74 but a rocker nest 81 and a rocker 82.

The actuator member 34 is held in alignment and in loose assembly with the fixture body 32 by a pair of shoulder screws 83 that extend freely through the rocker base 74, the rocker nest 81, and through a single elongated aperture 84 in the rocker and thread into a pair of bores 86 in the front side of the upper fixture body plate 37. This loose assembly allows movement of rocker in rocker nest and keeps fixture assembled during storage.

The fixture body plate 37 carries a pair of pivoting cams 90 and 91 that upon vise actuation shift the sleeve 58 upwardly. Toward this end, the cams 91 are pivoted on shoulder screws 92 in slots 94 in the forward upper side of the upper base plate 37, and these slots communicate with bores 54 so that the cams can project into the bores 54 through a slot 97 in the sleeve portion of sleeves 58 as seen best in FIG. 2B, FIG. 5 and FIG. 6. As the cams 90 and 91 rotate counter-clockwise from the position shown in FIG. 5 to the position shown in FIG. 6, the cams engage the upper end of the slots 97 driving the sleeves 58 upwardly against the force of spring plungers 72.

The cams 90 and 91 are actuated by a pair of cylindrical pins 98 seated in vertical bores partly exposed to the forward face of the rocker 82. Pins 98 engage rear lobes 100 on the cams 90 and 91 to effect cam actuation as the machine vise 12 is closed. The pins and cams are case hardened.

The rocker nest 81 and rocker 82 assure that equal forces will be delivered by the pins 98 to the cams 90 and 91 so that the actuation forces effected by each of the sleeves 58 is substantially the same. This also permits an accommodation for slightly different size workpieces. Toward this end, the rocker 82 has an arcuate rib 104 generated about a vertical axis that slides in a complimentary arcuate recess 106 in the rear surface of the rocker nest 81 so that the rocker 82 is free to slide in the slot 106 about the geometric axis of its trackway system with rocker nest 81. A pair of spring plungers 110 and 111 seated in the upper fixture body plate 37 engage the rear surface of the rocker 82 and return the rocker when at rest to a position parallel to the forward surface of the fixture body 32.

In operation, the vise is opened by counterclockwise rotation of the vise actuator 24 until the shoulder screws bottom out and this positions the fixture body 32 and the actuator member 34 in their fully separated position illustrated in FIG. 5. Collets 62 are then installed in the cylinder blocks 48 and 49 and drawn into the sleeves 58 by rotation of the take-up nuts 67. Workpieces 65 are then inserted into the collets until they engage collet stops 114 which locate the axial position of the workpieces 65 not only in the adapter 10 but with respect to the associated machine in which the vise 12 is clamped. Vise actuator 24 is then rotated in a counter-clockwise vise closing direction moving actuator member 34 toward the stationary fixture body 32. This drives pins 98 into the cam lobes 100 rotating the cams 90 and 91 upwardly engaging the top of sleeve slots 97 and driving the sleeves 58 upwardly over the collet tapered portions 62, with the collets being held stationary at that time by the take-up nuts 67 thereby simultaneously clamping the workpieces 65.

Figure 4:
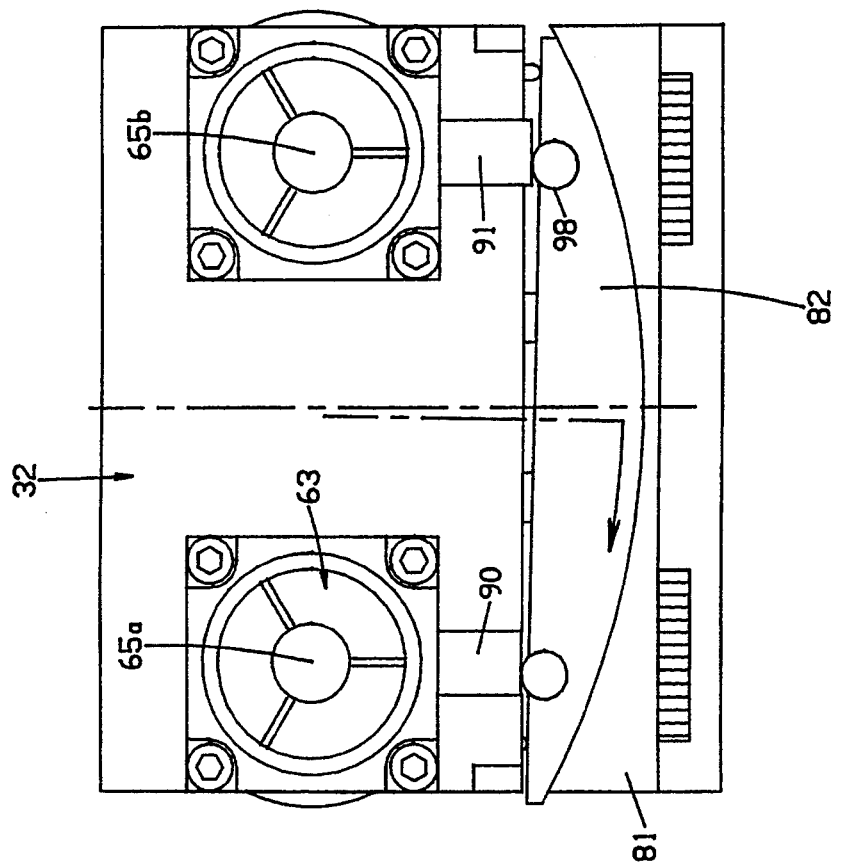
FIG. 4 is a top view of the adapter similar to FIG. 3 with somewhat differently sized workpieces in each collet.
Figure 3:
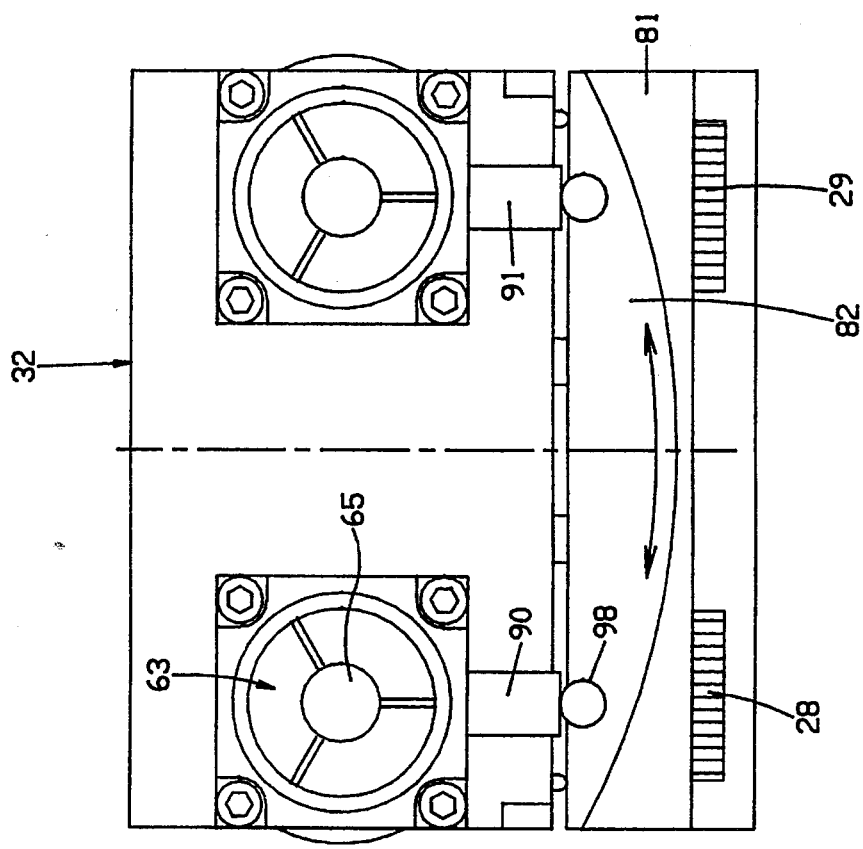
FIG. 3 is an enlarged top view of the adapter illustrated in FIG. 2A with the same size workpiece in each collet.

As seen in FIG. 3, with identical size workpieces 65, the rocker 82 remains parallel to the fixture body 32 with equal forces being provided by pins 98 against cams 90 and 91. However, as seen in FIG. 4, when workpiece 65a is slightly smaller in diameter than workpiece 65b, the rocker 82 will slide to the left or clockwise in FIG. 4 with respect to the rocker nest 81 to maintain an equal distribution of forces between pins 98 and cams 90 and 91 so clamping force remains the same on each regardless of workpiece diameter. Of course, the collets can accommodate only limited variations in workpiece diameter as is well known to experienced machine operators.

As seen in FIGS. 7 to 10, a somewhat different embodiment of the present invention is illustrated having a mode of operation similar to the FIGS. 1 to 7 embodiment except that in the FIGS. 7 to 10 embodiment, the collet is drawn into the sleeve rather than vise-a-versa, and it is constructed to receive, in addition to standard collets, step chucks to accommodate a wider range of workpiece diameters. Toward this end, adapter 120 is seen mounted in a machine vise 121 identical to vise 12, and the adapter is seen to include a similar, but not identical, two collet fixture body 124 connected to stationary vise element 126 with the same type of hand wheel bolts 128, and an actuator assembly 130 that is the same as the actuator member 34 illustrated in FIGS. 1 to 6. Fixture body 124 includes a lower base plate 132 and an upper base plate 134 that sandwich therebetween a pair of take-up nuts 136 in similar fashion to take-up nuts 67 in the earlier embodiment. Instead of the cylinder blocks 48 and 49 in the first embodiment, a pair of stationary sleeves 140 is fixed to the top base plate 134, and each has a cylindrical portion 141 and an upper tapered portion 142 that engage complementary surfaces on 5C Collet 144.

Actuator assembly 130 has a pair of pins 147 that engage cam lobes on cams 150 so that as the vise 121 closes, cams 150 are pivoted clockwise downwardly into engagement with the take-up nuts 136 driving the take-up nuts downwardly drawing the collets 144 into the stationary sleeves 140 effecting workpiece clamping, and the workpiece is denoted with the reference numeral 152 in FIGS. 7 and 8.

Cams 150 are seated and pivoted in slots 154 in the upper base plate 134.

Figure 10:
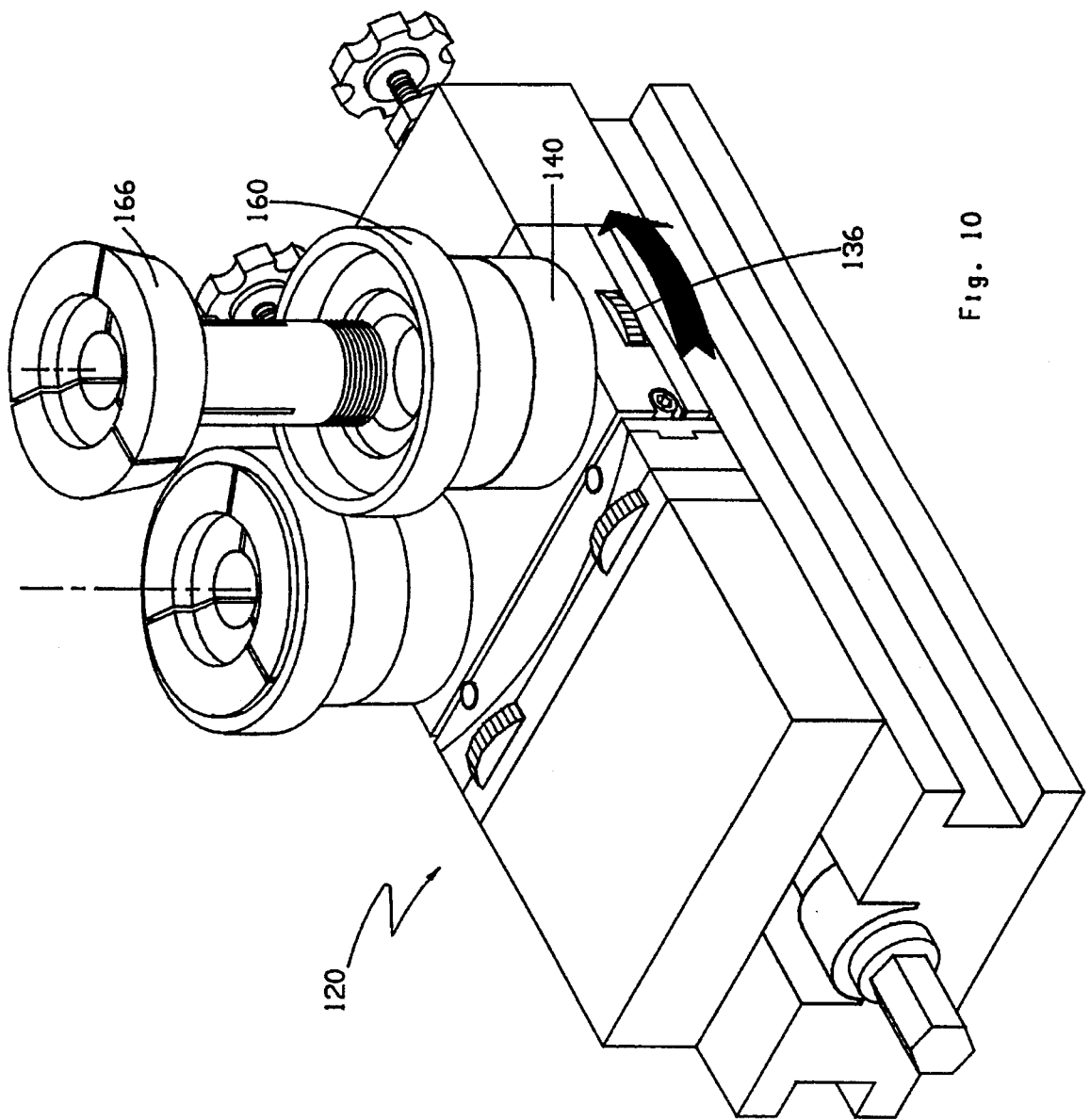
FIG. 10 is a perspective view of the adapter illustrated in FIG. 9 shown assembled into a machine vise after installation of one step chuck and in preparation for the installation of the second.

One advantage in the FIGS. 7 and 10 embodiment is the ability of the sleeves 140 to accommodate step chuck closures and step chucks which permit this adapter to accommodate a wider range of workpiece sizes.

Toward this end and as seen in FIG. 9, the upper ends of sleeves 140 are threaded at 141 to receive step chuck closures 160 that have enlarged upper recesses 162 and internal threads 164 that thread to the sleeve threads 141. After threading the step chuck closures onto the sleeves 140, a pair of step chucks 164, which replace the 5C Collets 144, is inserted into the sleeves and initially drawn into the sleeves 140 by rotation of the take-up nuts 136. Cams 150 operate upon vise closure to drive the take-up nuts 136 and the step chucks 166 downwardly to effect workpiece clamping in the same manner as the 5C Collets 144 described above in connection with FIGS. 7 and 8.

I claim:

1. A collet adapter for converting a standard machine vise into a collet fixture wherein the vise includes relatively removable elements, vise jaws and an actuator, comprising: a first member and a second member, means on the first and second members for fixedly attaching them to the vise elements, a sleeve carried by one of the first and second members having an axially tapered internal portion, a workpiece receiving collet in the sleeve having an axially tapered outer portion engaging the tapered internal portion on the sleeve, and means for moving the collet axially relative to the sleeve as the first member moves relative to the second member so a workpiece in the collet is radially clamped thereby, said means for moving the collet axially relative to the sleeve including a cam pivotal on an axis perpendicular to the axis of the collet in at least one plane, said cam being responsive to movement of the vise elements which in turn causes movement of the first and second members effecting workpiece clamping and unclamping without requiring the set-up of a conventional collet fixture.

2. A collet adapter as defined in claim 1, wherein the machine vise elements move generally along a first axis and the adapter sleeve and collet move relatively along a second orthogonal axis.

3. A collet adapter as defined in claim 1, wherein the sleeve and collet are generally vertical.

4. A collet adapter as defined in claim 1, wherein the collet and sleeve are mounted in the first member along a common vertical axis, said cam also being mounted in the first member for movement about a generally horizontal axis.

5. A collet adapter as defined in claim 4, including a take-up nut rotatably mounted in the first member and engageable with threads on one end of the collet to draw the collet initially into the sleeve, said cam being engageable with one of the take-up nut and sleeve to move the sleeve relative to the collet to effect workpiece clamping and unclamping.

6. A collet adapter as defined in claim 5, wherein the sleeve is fixed to the first member and the cam directly engages the take-up nut to draw the collet into the sleeve.

7. A collet adapter as defined in claim 5, wherein the sleeve is movable in the first member and the collet while the collet is held stationary by the take-up cam directly engages the sleeve to push the sleeve over the nut to effect clamping and unclamping of the workpiece.

8. A collet adapter as defined in claim 1, wherein the sleeve is fixed with respect to the first member, a step chuck closer having an enlarged head threadedly engageable with the top of the sleeve, said collet being a step chuck having an enlarged head seatable in the step chuck closer and the sleeve.

9. A collet adapter as defined in claim 1, including at least one quick connect hand bolt for attaching one of the members to one of the elements of the machine vise through a through-bore therethrough, said hand screw including a threaded portion having a diameter less than the through-bore in the one element of the machine vise and threadedly engageable with a complementary threaded bore in said one adapter member, said hand screw including an enlarged hand wheel for easy and rapid attachment of the one member to the one machine vise element.

10. A collet adapter as defined in claim 9, including a manually rotatable clamp bolt in the other member for fixing the other member to the other machine vise element.

11. A collet adapter as defined in claim 1, wherein the one member carries two sleeves each receiving a collet, said cam including two spaced cams in the one member for causing axial movement of both sleeves relative to their contained collets to simultaneously clamp and unclamp two workpieces, one of the adapter members having a rocker and a cooperating rocker nest to balance the forces acting on the two cams.

12. A collet adapter for converting a standard machine vise into a collet fixture wherein the vise includes relatively removable elements, vise jaws and an actuator, comprising: a first member and a second member, means on the first and second members for fixedly attaching them to the vise elements, a sleeve carried by one of the first and second members having an axially tapered internal portion, a workpiece receiving collet in the sleeve having an axially tapered outer portion engaging the tapered internal portion on the sleeve, and means for moving the collet axially relative to the sleeve as the first member moves relative to the second member so a workpiece in the collet is radially clamped thereby, said means for moving the collet axially relative to the sleeve including a cam pivotal on an axis perpendicular to the axis of the collet in at least one plane, said cam being responsive to movement of the vise elements which in turn causes movement of the first and second members effecting workpiece clamping and unclamping without requiring the set-up of a conventional collet fixture, said machine vise elements moving generally along a first axis and the adapter sleeve and collet moving relatively along a second orthogonal axis.

13. A collet adapter for converting a standard machine vise into a collet fixture wherein the vise includes relatively removable elements, vise jaws and an actuator, comprising: a first member and a second member, means on the first and second members for fixedly attaching them to the vise elements, a sleeve carried by one of the first and second members having an axially tapered internal portion, a workpiece receiving collet in the sleeve having an axially tapered outer portion engaging the tapered internal portion on the sleeve, means for moving the collet axially relative to the sleeve as the first member moves relative to the second member so a workpiece in the collet is radially clamped thereby, said means for moving the collet axially relative to the sleeve including a cam pivotal on an axis perpendicular to the axis of the collet in at least one plane, said cam being responsive to movement of the vise elements which in turn causes movement of the first and second members effecting workpiece clamping and unclamping without requiring the set-up of a conventional collet fixture, said collet and sleeve being carried by the first member along a common vertical axis, said cam being mounted in the first member for movement about a generally horizontal axis, and a take-up nut rotatably mounted in the first member and engageable with threads on one end of the collet to draw the collet initially into the sleeve, said cam being engageable with one of the take-up nut and sleeve to move the sleeve relative to the collet to effect workpiece clamping and unclamping.

14. A collet adapter for converting a standard machine vise into a collet fixture wherein the vise includes relatively removable elements, vise jaws and an actuator, comprising: a first member and a second member, means on the first and second members for fixedly attaching them to the vise elements, a sleeve carried by one of the first and second members having an axially tapered internal portion, a workpiece receiving collet in the sleeve having an axially tapered outer portion engaging the tapered internal portion on the sleeve, and means for moving the collet axially relative to the sleeve as the first member moves relative to the second member so a workpiece in the collet is radially clamped thereby, said means for moving the collet axially relative to the sleeve including a cam pivotal on an axis perpendicular to the axis of the collet in at least one plane, said cam being responsive to movement of the vise elements which in turn causes movement of the first and second members effecting workpiece clamping and unclamping without requiring the set-up of a conventional collet fixture, said sleeve being fixed with respect to the first member, a step chuck closer having an enlarged head threadedly engageable with the top of the sleeve, said collet being a step chuck having an enlarged head seatable in the step chuck closer and the sleeve.

15. A collet adapter for converting a standard machine vise into a collet fixture wherein the vise includes relatively removable elements, vise jaws and an actuator, comprising: a first member and a second member, means on the first and second members for fixedly attaching them to the vise elements, a sleeve carried by one of the first and second members having an axially tapered internal portion, a workpiece receiving collet in the sleeve having an axially tapered outer portion engaging the tapered internal portion on the sleeve, means for moving the collet axially relative to the sleeve as the first member moves relative to the second member so a workpiece in the collet is radially clamped thereby, and at least one quick connect hand bolt for attaching one of the members to one of the elements of the machine vise through a through-bore therethrough, said hand screw including a threaded portion having a diameter less than the through-bore in the one element of the machine vise and threadedly engageable with a complementary threaded bore in said one adapter member, said hand screw including an enlarged hand wheel for easy and rapid attachment of the one member to the one machine vise element.

16. A collet adapter as defined in claim 15, including a manually rotatable clamp bolt in the other member for fixing the other member to the other machine vise element.

17. A collet adapter for converting a standard machine vise into a collet fixture wherein the vise includes relatively removable elements, vise jaws and an actuator, comprising: a first member and a second member, means on the first and second members for fixedly attaching them to the vise elements, a sleeve carried by one of the first and second members having an axially tapered internal portion, a workpiece receiving collet in the sleeve having an axially tapered outer portion engaging the tapered internal portion on the sleeve, and means for moving the collet axially relative to the sleeve as the first member moves relative to the second member so a workpiece in the collet is radially clamped thereby, said means for moving the collet axially relative to the sleeve including a cam pivotal on an axis perpendicular to the axis of the collet in at least one plane, said cam being responsive to movement of the vise elements which in turn causes movement of the first and second members effecting workpiece clamping and unclamping without requiring the set-up of a conventional collet fixture, said one member carrying two sleeves each receiving a collet, said cam including two spaced cams in the other member for causing axial movement of both sleeves relative to their contained collets to simultaneously clamp and unclamp two workpieces, one of the adapter members having a rocker and a cooperating rocker nest to balance the forces acting on the two cams.

* * * * *